UNITED STATES PATENT OFFICE 1,947,027

AZO DYES

Harold Edward Woodward, Penns Grove, N. J., assignor to E. I. du Pont de Nemours & Company, Wilmington, Del., a corporation of Delaware No Drawing. Application December 1, 1931
Serial No. 578,420

12 Claims. (Cl. 260—83)

This invention relates to new chemical compounds, and more particularly to the production of new azo dyes containing no sulfonic or carboxylic groups.

One of the objects of the invention is the production of new compositions of matter. A further object is the production of new dyes valuable for the coloring of organic liquids, especially hydrocarbons and halogenated hydrocarbons. Other objects will appear hereinafter.

These objects are accomplished by producing new compounds having the following probable formula:

$$\begin{array}{c} X \\ \diagdown \\ Y \diagup \end{array} N(Z)-R-N=N-R'-N=N-R''$$

in which R is an aromatic radical, residue, or nucleus of the benzene series which contains no sulfonic or carboxylic groups but may contain other substituents such as, for example, alkyl and alkoxy groups; R' is an aromatic residue of the benzene or naphthalene series with the azo groups para to each other, having no sulfonic or carboxylic groups, and preferably containing as a substituent one or more members of the group consisting of alkyl and alkoxy radicals; R'' is a naphthol or naphthol derivative having no sulfonic or carboxylic groups and preferably containing as a substituent at least one of the members of the group consisting of —NH₂, —CONH-alkyl, —CONH aryl, CON(alkyl)₂, and $$-CON\diagdown\begin{array}{c}alkyl\\aryl\end{array};$$

X is an alkyl group or hydrogen; Y is an alkyl or an aryl group; Z is a group which may be

or $$O=\overset{|}{\underset{|}{S}}=O.$$

These compounds are obtained by diazotizing an amino-aryl carboxylamide derivative or an amino-aryl sulfonamide derivative containing no sulfonic or carboxylic groups, coupling the resultant product with an aromatic amine of the benzene or naphthalene series which can couple in the position para to the amino group and contains no sulfonic or carboxylic groups, diazotizing the resulting amino azo compound and coupling with a naphthol or naphthol derivative containing no sulfonic or carboxylic groups.

While the invention is susceptible of considerable variation and modification in the manner of its practical application, particularly as regards the nature and proportions of materials used and conditions of temperature, volumes, etc., the following examples will illustrate some of the products falling within the invention and how they may be prepared. The proportions given are in parts by weight.

*Example 1.*—The aminoazo compound prepared, as hydrochloride, from 248 parts of para-amino-dibutyl-benzamide and 153 parts of amino-hydroquinone-dimethyl-ether is stirred with 6000 parts of water and diazotized with 55 parts of hydrochloric acid (100%) and 76 parts of sodium nitrite at 10° C. for one hour. The brown solution of the diazo compound is filtered and added at 5–10° C. to a solution of 152 parts of beta-naphthol, 44 parts of sodium hydroxide and 106 parts of sodium carbonate in 2500 parts of water. When the coupling is finished the dyestuff is filtered at 40° C., washed and dried. The product is a black powder, insoluble in water but soluble in many organic liquids with a bluish-red color. The maximum absorption of light in its gasoline solution is at about 550 millimicrons. The constitution of this dye is represented by the following structural formula:

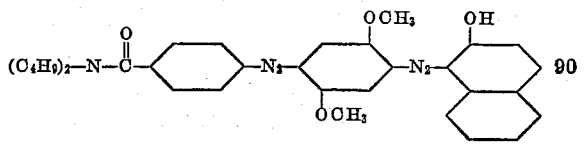

*Example 2.*—The aminoazo compound prepared as the hydrochloride from 230 parts of 2-amino-anisol-5-dimethyl-sulfonamide and 173 parts of 1-amino-2-naphthol-methyl-ether is stirred with 6000 parts of water and diazotized with 55 parts of hydrochloric acid (100%) and 76 parts of sodium nitrite at 10° C. for one hour. The diazo compound is added at 5–10° C. to a solution of 152 parts of beta-naphthol, 44 parts of sodium hydroxide and 106 parts of sodium carbonate in 2500 parts of water. When the coupling is complete the dyestuff is filtered at 50° C., washed and dried. It is a black powder, soluble in organic solvents with a blue-violet color, the maximum absorption of light of its solution in gasoline being at about 580 millimicrons. Its constitution may be represented by the following structural formula:

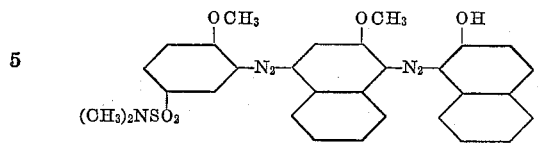

*Example 3.*—The aminoazo compound prepared as the hydrochloride from 248 parts of para-amino-dibutyl-benzamide and 173 parts of 1-amino-2-naphthol-methyl-ether is stirred with 6000 parts of water and diazotized with 55 parts of hydrochloric acid (100%) and 76 parts of sodium nitrite at 10° C. for one hour. The brown solution of the diazo compound is filtered into a solution of 277 parts of 2-hydroxy-3-naphthanilide and 80 parts of sodium hydroxide in 400 parts of alcohol (95%) and 500 parts of water. The coupling is made at 10° C. and the resultant product is then filtered at 55° C., washed and dried. The product is a dark blue powder, soluble in organic solvents with a blue color. The maximum absorption of light in its gasoline solution is at about 590 millimicrons. The structural formula of this dye may be represented as follows:

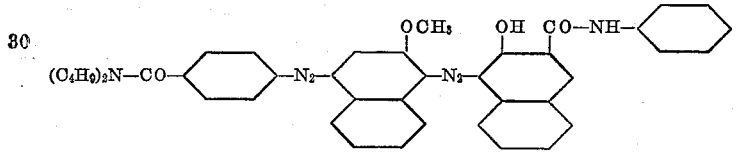

*Example 4.*—The aminoazo compound prepared as the hydrochloride from 164 parts of para-amino-dimethyl-benzamide and 173 parts of 1-amino-2-naphthol-methyl-ether is stirred with 6000 parts of water and diazotized with 55 parts of hydrochloric acid (100%) and 76 parts of sodium nitrite at 10° C. for one hour. The soluble brown diazo compound is filtered into a solution of 167 parts of 1-amino-7-naphthol, 44 parts of sodium hydroxide and 106 parts of sodium carbonate in 4000 parts of water. The temperature of this coupling is 5–10° C. After coupling is complete the insoluble color is filtered at 75° C. The product is a black powder very insoluble in water but soluble in organic solvents with a green color. Its gasoline solution shows a maximum absorption of light at about 610 millimicrons. Its constitution is probably as shown in the following structural formula:

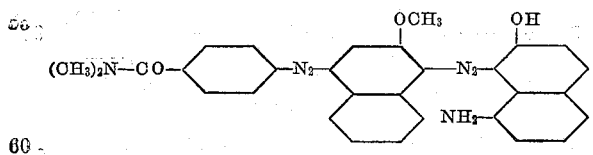

It will be understood that the specific examples of dyes and methods of preparing them which are given above are not intended to limit the scope of the invention. As previously indicated, the method of preparation may be modified considerably as to volumes, temperatures, and other conditions without greatly affecting the results obtained. Any other amino-aryl carboxylamide or sulfonamide containing no sulfonic or carboxylic groups may be employed as a first component. Likewise, other members of the benzene and naphthalene series as defined by R' and R'' in the general formula may be employed as second and last components, respectively.

Especially good results are obtainable when the first components employed are p-amino-dibutyl-benzamide, 2-amino-anisol-5-dimethyl-sulfonamide, p-amino-dimethyl-benzamide, meta-amino-dimethyl-benzamide, para-amino-benzanilide, para-amino-benzoyl-ethylaniline, 2-amino-toluene-4-dimethyl-sulfonamide, 2-amino-anisol-4-dimethyl-benzamide and other dialkylamides of amino-benzoic acids, anisidine, aniline, toluidine, or xylidine sulfonic acids. In general, the lowest melting amino dialkyl benzamides are preferred, and especially dibutylbenzamide.

Second components giving especially desirable results are: amino-hydroquinone-dimethyl-ether, 1-amino-2-naphthol-methyl-ether, cresidine, alpha-naphthylamine, 1-amino-7-naphthol, 1-amino-naphthyl-6- or 7-dimethyl-sulfonamide and other alpha-naphthylamine derivatives which can couple in the 4- position and contain no carboxylic or sulfonic groups.

As last components, beta-naphthol, 2-hydroxy-3-naphthanilide, 1-amino-7-naphthol, 2-hydroxy-3-ethyl-naphthamide, 2-hydroxy-3-phenyl-ethyl-naphthamide, 2-hydroxy-3-dibutylnaphthamide are preferably employed.

Throughout the specification and claims, it will be understood that by aryl group is meant an aromatic radical of the benzene series; by alkyl group is meant an acyclic radical derived from a hydrocarbon by the elimination of one atom of hydrogen, such as, for example, —CH$_3$, —C$_2$H$_5$, etc.; and by alkoxy is meant an acyclic oxy-alkyl radical of the type —OCH$_3$, —OC$_2$H$_5$, or other acyclic ether radical.

Compounds produced in accordance with the present invention are especially valuable for coloring organic liquids and solids, particularly hydrocarbons, and halogenated hydrocarbons, either aliphatic or aromatic, such as, for example, gasoline, ethylene dibromide, carbon tetrachloride, paraffin and halowax (chlorinated naphthalene). Their tinctorial power is such that about 10 milligrams of dye gives a pleasing depth of color to one liter of the liquid treated.

As many apparent and widely different embodiments of this invention may be made without departing from the spirit thereof, it is to be understood that I do not limit myself to the foregoing examples or description except as indicated in the following claims.

I claim:

1. A chemical compound having the probable general formula:

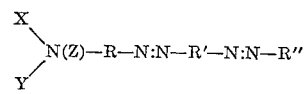

wherein R is an aromatic radical of the benzene series containing no sulfonic or carboxylic groups, R' is an aromatic residue of the benzene or naphthalene series with the azo groups para to each other and containing no sulfonic or carboxylic groups, R'' is a naphthol containing no sulfonic or carboxylic groups, X is a member of the group consisting of an alkyl radical and hydrogen, Y is a member of the group consisting of an alkyl radical and an aromatic radical of the benzene series, and Z is a member of the group consisting of

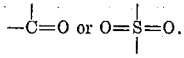

2. The chemical compound set forth in claim 1 wherein R' contains as a substituent one or more members of the group consisting of alkyl and alkoxy radicals.

3. The chemical compound set forth in claim 1 wherein R'' contains as a substituent one of the members of the group consisting of —NH₂, —CONH alkyl, —CONH aryl, —CON(alkyl)₂ or

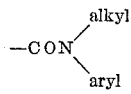

4. The chemical compound set forth in claim 1 wherein R contains as a substituent an alkoxy radical.

5. A chemical compound having the general formula set forth in claim 1, wherein R is an aromatic radical of the benzene series containing no sulfonic or carboxylic groups, R' is an aromatic radical of the benzene or naphthalene series with the azo groups para to each other, having no sulfonic or carboxylic groups and containing as a substituent one or more members of the group consisting of alkyl and alkoxy radicals, R'' is a naphthol containing as a substituent a member of the group consisting of —NH₂, —CONH alkyl, —CONH aryl, —CON(alkyl)₂ or

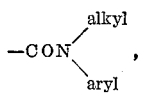

X is a member of the group consisting of an alkyl radical and hydrogen, Y is a member of the group consisting of an alkyl radical and an aromatic radical of the benzene series, and Z is a member of the group consisting of

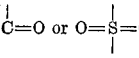

6. The chemical compound set forth in claim 1, wherein Z is the radical

X and Y are alkyl groups, and R' contains as a substituent at least one alkoxy group.

7. A chemical compound having the formula:

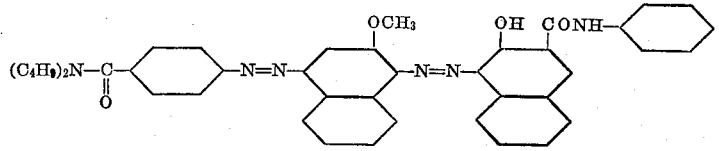

8. The process of preparing a disazo dye which comprises diazotizing a member selected from the group consisting of amino-aryl carboxylamides and amino-aryl sulfonamides containing no sulfonic or carboxylic groups, coupling the resultant product with an aromatic amine of the benzene or naphthalene series which can couple in the position para to the amino group and contains no sulfonic or carboxylic groups, diazotizing the resulting amino azo compound and coupling with a naphthol containing no sulfonic or carboxylic groups.

9. The process of preparing a disazo dye which comprises diazotizing an amino benzamide containing no sulfonic or carboxylic groups, coupling the resultant product with an alpha naphthylamine which can couple in the 4- position and contains as a substituent at least one alkoxy group, diazotizing the resulting aminoazo compound and coupling with a naphthol containing as a substituent a member of the group consisting of —NH₂, —CONH alkyl, —CONH aryl, —CON(alkyl)₂ and

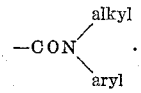

10. The process of preparing a disazo dye which comprises diazotizing a dialkyl benzamide containing no sulfonic or carboxylic groups, coupling the resultant product with an alpha naphthylamine which can couple in the 4- position and contains as a substituent at least one alkoxy group, diazotizing the resulting aminoazo compound and coupling with a naphthol containing as a substituent a member of the group consisting of —NH₂, —CONH alkyl, —CONH aryl, —CON(alkyl)₂ and

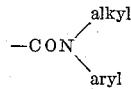

11. A disazo dye having the following general formula:

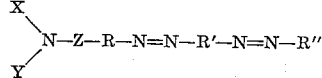

in which R represents a benzene nucleus containing no sulfonic or carboxylic groups but which may have substituted thereon one or more members of the group consisting of alkyl and alkoxy radicals, R' represents a benzene or naphthalene nucleus with the azo groups para to each other and containing no sulfonic or carboxylic groups but which may have substituted thereon one or more members of the group consisting of alkyl and alkoxy radicals, R'' represents a naphthol nucleus containing no sulfonic or carboxylic groups but which may have substituted thereon a member selected from the group consisting of —NH₂, —CONH alkyl, —CONH aryl, —CON(alkyl)₂, and

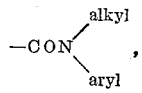

X represents hydrogen or an alkyl radical, Y represents an alkyl or an aryl radical of the benzene series, and Z represents =CO or =SO₂.

12. A process for producing disazo dyes which comprises diazotizing an aromatic amine of the benzene series having the following general formula:

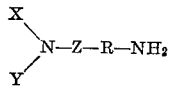

in which R represents a benzene nucleus containing no sulfonic or carboxylic groups but which may have substituted thereon one or more members selected from the group consisting of alkyl and alkoxy radicals, X represents hydrogen or an alkyl radical, Y represents an alkyl or an aryl radical of the benzene series, and Z represents =CO or =SO$_2$, then coupling the resultant diazo salt in a position para to the amino group of an aromatic amine of the benzene or naphthalene series, which amine may contain one or more members selected from the group consisting of alkyl and alkoxy radicals, but contains no sulfonic or carboxylic groups, diazotizing the resultant aminoazo compound and coupling it with a naphthol containing no sulfonic or carboxylic groups but which may have substituted thereon a member selected from the group consisting of —NH$_2$, —CONH alkyl, —CONH aryl, —CON(alkyl)$_2$, and

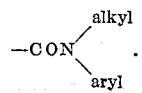

HAROLD E. WOODWARD.